United States Patent [19]

Burdick

[11] Patent Number: 4,883,536

[45] Date of Patent: Nov. 28, 1989

[54] SUSPENSION OF WATER-SOLUBLE POLYMERS IN AQUEOUS MEDIA CONTAINING DISSOLVED SALTS

[75] Inventor: Charles L. Burdick, Landenberg, Pa.

[73] Assignee: Aqualon Company, Wilmington, Del.

[21] Appl. No.: 229,379

[22] Filed: Aug. 5, 1988

[51] Int. Cl.$^4$ ............................ C08L 1/08; C08K 3/00
[52] U.S. Cl. ..................................... 106/194; 524/416; 524/423; 524/401
[58] Field of Search ....................... 106/194, 169, 171; 524/416, 423, 401; 536/85

[56] References Cited

U.S. PATENT DOCUMENTS

| | | | |
|---|---|---|---|
| 3,894,879 | 7/1975 | Colgegrove | 106/189 |
| 3,894,880 | 7/1975 | Colegrove | 252/316 |
| 4,069,062 | 1/1978 | Burge | 106/314 |
| 4,283,229 | 8/1981 | Girg et al. | 106/171 |
| 4,296,235 | 10/1981 | Ziche | 536/85 |
| 4,312,675 | 1/1982 | Pickens et al. | 106/171 |
| 4,325,861 | 4/1982 | Braun et al. | 523/205 |
| 4,364,836 | 12/1982 | Ziche | 252/135 |
| 4,726,912 | 2/1988 | Bishop et al. | 252/309 |
| 4,792,357 | 12/1988 | Bier | 106/194 |

OTHER PUBLICATIONS

Hercules, Klucel ® Hydroxypropylcellulose, Chemical and Physical Properties (1986).
Aqualon, Natrosol ® Hydroxyethylcellulose, A Nonionic Water-Soluble Polymer (1987).
Hercules ® Cellulose Gum, Chemical and Physical Properties (1984).
Chem Abst 63: 10170 h.

*Primary Examiner*—Theodore Morris
*Attorney, Agent, or Firm*—Mark D. Kuller

[57] ABSTRACT

An aqueous suspension comprising 15% or more, by total weight of the suspension, of at least one anionic or nonionic water-soluble polymer dispersed in an aqueous solution of an ammonium salt having a multivalent anion, wherein the weight ratio of the ammonium salt to the water is at least 0.15, a process for preparing the same, and use of the same in a variety of applications, are disclosed.

26 Claims, No Drawings

SUSPENSION OF WATER-SOLUBLE POLYMERS IN AQUEOUS MEDIA CONTAINING DISSOLVED SALTS

This invention is directed to stable aqueous suspensions of water-soluble polymers. The suspensions comprise 15% or more, by total weight, of at least one anionic or nonionic water-soluble polymer dispersed in an aqueous solution of an ammonium salt having a multivalent anion.

BACKGROUND OF THE INVENTION

Water-soluble polymers have traditionally been handled in their dry, particulate form. Problems associated with dry polymers include undesirable dust generation, poor dispersibility when added to aqueous systems, and undesirably long dissolution times.

The dust associated with dry, particulate water-soluble polymers presents the same conventional handling problems as are encountered with similar particulate materials. One major concern is the possibility of dust explosions.

Water-soluble polymers are hygroscopic and absorb water from the air, which can cause agglomeration of the particles. Such agglomerated particles are very difficult, if not impossible, to disperse in an aqueous system.

When added to aqueous systems, water-soluble polymers tend to agglomerate to form clumps. Agglomeration can be reduced in many cases by adding the polymer to the aqueous system slowly with agitation. Slow dissolution substantially reduces the speed of manufacturing operations.

For the above reasons, plant operators desire a fast, effective and simple way of incorporating water-soluble polymers into an aqueous system.

Bishop et al, in U.S. Pat. No. 4,726,912, describe a hydrocarbon oil based suspension of carboxymethylcellulose which upon contact with aqueous fluids facilitates dispersion of the carboxymethylcellulose in the water phase. They state that use of carboxymethylcellulose having a moisture content of 12 to 25 weight percent permits the formation of stable suspensions of carboxymethylcellulose in a hydrocarbon oil which additionally contains anionic surfactants and suspending agents. This suspension can be transported to plants where the carboxymethylcellulose is to be used.

Pickens et al, in U.S. Pat. No. 4,312,675, describe high concentration polymer slurries containing up to 65 weight % of a hydrophilic colloid in a hydrophobic solvent.

Colegrove, in U.S. Pat. No. 3,894,879, states that water-soluble xanthan gum can be prepared as a highly concentrated suspension in alcohol-water carriers using hydroxyalkyl cellulose derivatives as the suspending agents, and, in U.S. Pat. No. 3,894,880, states that water-soluble alginates can be prepared as highly concentrated pumpable suspension in alcohol-water carriers using xanthan gum as a suspending agent.

Braun et al, in U.S. Pat. No. 4,325,861, describe a nonaqueous composition adapted to provide, upon dilution with water, a solution containing a high molecular weight water-soluble polymer. The nonaqueous composition comprises (a) a particulate water-soluble polymer, (b) a water-insoluble, organic liquid vehicle, (c) an inert, nonionic surfactant, and (d) an inert thickening agent.

Organic based systems, such as those described above, are not suitable for many applications. The organic materials present in such systems are undesirable in many end use applications. Further, the organic media are flammable and expensive. Accordingly, a water-based system has been desired.

Burge, in U.S. Pat. No. 4,069,062, describes a method of incorporating water-soluble polymers into mortar or concrete by dispersing an unswollen, water-soluble, swellable polymer in an aqueous solution of a water-soluble salt or organic solvent in which said substance is only partially soluble or totally insoluble and, then, mixing this dispersion into the mortar or concrete. Burge states that the salt or organic solvent serves to prevent dissolution and swelling of the polymeric substance. Specifically mentioned are aqueous solutions of $NaCl$, $Na_2SO_4$, $MgSO_4$, $Al_2(SO_4)_3$ and $NaH_2PO_4$, alcohol and glycol. Bentonite is used as a stabilizer.

Girg et al, in U.S. Pat. No. 4,283,229, disclose that a stable suspension can be prepared by adding a nonionic, water-soluble cellulose ether derivative to a solution of an electrolyte if alumina is added to the suspension. Suitable electrolytes are described to include metal or ammonium salts of mineral acids or organic acids, especially salts which contain an alkali metal ion, an alkaline earth metal ion, an earth metal ion, or a zinc, copper, iron or manganese ion as the cation, and a sulfate, carbonate, silicate, sulfite, halide, phosphate, nitrate, nitrite, acetate, formiate, tartate, or citrate ion, including their hydrogen salts, as the anion. It is stated that stable solutions of the cellulose derivatives are only formed when alumina is added to the system.

None of these aqueous systems provides a suitable method of dispersing high concentrations of water-soluble polymer in an aqueous system, as gels tend to form at high water-soluble polymer concentrations and the products will not flow or be readily pumpable. Accordingly, users of water-soluble polymers desire a stable, concentrated, aqueous water-soluble polymer suspension that can be used to incorporate water-soluble polymers in aqueous solutions readily, without formation of agglomerates or clumps, and which may be handled without the problems associated with dry powder water-soluble polymers.

SUMMARY OF THE INVENTION

This invention is an aqueous suspension comprising 15% or more, by total weight of the suspension, of at least one anionic or nonionic water-soluble polymer dispersed in an aqueous solution of an ammonium salt having a multivalent anion, wherein the weight ratio of the ammonium salt to the water is at least 0.15.

DETAILED DESCRIPTION OF THE INVENTION

This invention is a stable, pourable fluid suspension containing high concentrations of water-soluble polymer.

"Suspension", "dispersion", "solution" and other terms are often confused. Thus, it should be understood that herein "suspension" and "dispersion" are used interchangeably to mean a system in which solid particles (water-soluble polymer) are dispersed in a liquid (water). It should also be understood that "solution" means a homogenous mixture of a solvent (e.g., water) with a solute (e.g., dissolved ammonium salt, dissolved water-soluble polymer, etc.).

Useful water-soluble polymers are nonionic or anionic and possess numerous hydrophilic substituents, such as hydroxyl, carboxyl, ether or amide substituents, attached directly or indirectly to a polymeric molecular backbone or chain, such that the number average molecular weight of the polymer is high, e.g., such that the solution viscosity is on the order of 5,000 or more centipoise in a 5 weight percent aqueous polymer solution and in larger amounts, e.g., 5–10 weight percent, their aqueous solution viscosities are extremely high or they form a gel. For reasons of this very high viscosity, these polymers cannot normally be pumped or handled (dissolved) in aqueous media when their concentration exceeds 5–10 weight percent.

Well known are natural gums and their derivatives, such as cellulose derivatives, guar and its derivatives, xanthan gum, starch and its derivatives, etc.; partially and fully hydrolyzed polyvinyl alcohols; polyacrylamide polymers and copolymers, polyvinylpyrrolidone and derivatives thereof and polyamides, etc. Illustrative are polyacrylamide, carboxymethylcellulose (sodium and other salts), hydroxyethylcellulose hydroxypropylcellulose, carboxymethylhydroxyethylcellulose, hydrophobically modified hydroxyethylcellulose (this term refers to water-soluble hydroxyethycellulose polymers further comprising $C_6$–$C_{24}$ alkyl groups as described by Landoll in U.S. Pat. Nos. 4,288,277 and 4,352,916), partially and fully hydrolyzed polyvinyl alcohol, hydroxyethylhydroxypropylcellulose, polyvinyl alcohol, guar, hydroxypropyl guar, polyethylene oxide, xanthan gum, polyacrylamide, polyvinylpyrrolidone, methylhydroxypropylcellulose (also well known as hydroxypropylmethylcellulose), methylhydroxyethylcellulose, 3-alkoxy-2-hydroxypropylhydroxyethylcellulose (e.g., 3-alkoxy-2-hydroxypropylhydroxyethylcellulose wherein alkyl is 2–8 are described by t'Sas in U.S. Pat. application No. 07/063,568, filed June 17, 1987, and 3-alkoxy-2-hydroxypropylhydroxylethylcellulose wherein alkyl is 6–24 is described by the U.S. Patent application filed on July 25, 1988, by John David Angerer, entitled "Aqueous Protective Coating Composition Comprising 3-alkoxy-2-hydroxypropylhydroxyethylcellulose and Film Forming Latice"), etc. Preferred are sodium carboxymethylcellulose, anionic polyacrylamide, hydroxyethylcellulose, hydroxypropylcellulose, carboxymethylhydroxyethylcellulose, hydrophobically modified hydroxyethylcellulose and 3-butoxy-2-hydroxypropylhydroxyethylcellulose.

Suspensions according to this invention contain 15% or more of the particulate water-soluble polymer. Preferably, the concentration of water-soluble polymer will be in the range of 20 to 50% and most preferably in the range of 22 to 35%.

Any ammonium salt having having a multivalent anion and which may be dissolved in water to a sufficiently high concentration that it will render the water-soluble polymer insoluble with minimal swelling, can be used in this invention. Preferred are diammonium phosphate, diammonium sulfate (also known as ammonium sulfate), ammonium polyphosphate, and mixtures thereof. Diammonium phosphate is available from Monsanto Company, St. Louis, Mo., J. T. Baker Chemical Co., Phillipsburgh, N.J., and FMC Corporation, Philadelphia, Pa. Diammonium sulfate is readily available from numerous sources such as Agway, Inc., Syracuse, N.Y. Fertilizer fluids, such as "10-34" ammonium polyphosphate fertilizer fluid, are available from numerous producers such as Willard Agricultural Service, Lynch, Md.

The weight ratio of the ammonium salt to the water is at least 0.15 in this invention and is preferably 0.18 to 0.6. The desired concentration of salt in water varies with the polymer type to be suspended. For suspending polymers such as hydroxyethylcellulose, for example, a salt-to-water ratio of 0.18 to 0.25 is preferred, whereas for suspending carboxymethylhydroxyethylcellulose a salt-to-water ratio of 0.3 to 0.4 is preferred, and for suspending carboxymethylcellulose a salt-to-water ratio of 0.4 to 0.6.

A number of other additives have been found to provide beneficial properties to this invention. Preferred additives are stabilizers, such as hydrophilic fumed silica and clays such as attapulgite clay. They increase the time over which the suspension will remain stable. Also useful for stabilization, in certain circumstances, are carboxymethyl cellulose, xanthan gum and other water-soluble polymers. For instance, the most preferred stabilizer for hydroxyethyl cellulose suspensions are sodium carboxymethyl cellulose and xanthan gum. Stabilizers are generally used in amounts up to about 2%, and are preferably used in an amount of 0.5% to 1%, by weight of the total suspension.

Other additives which can be used include pigments, dispersants, surfactants, glycols and thickening agents. These are generally used in amounts up to 10%, preferably 0.5% to 2%, by weight of the total suspension.

The suspensions of this invention can be prepared by dissolving the ammonium salt in water to form an aqueous salt solution and, then, dispersing with agitation the water-soluble polymer therein. In the case where other additives are employed, these are typically added to the water before the salt.

By "stable" is meant that the dispersed phase (water-soluble polymer) and aqueous phase do not separate for some minimum time after preparation, or if separation does occur the polymer may be readily redispersed with a minor amount of agitation. Stability is a function of the polymer and salt used, as well as their concentration. The suspensions of this invention are stable as made. They are preferably stable for at least three hours after preparation, more preferably stable for at least one day after preparation, and most preferably stable for at least one month after preparation. The stability of the suspensions of this invention can be further improved by mixing the solution in a vacuum, so as to remove entrained air. The prolonged stability of the suspensions of this invention permits their preparation at one location and transportation to another location where they are to be used.

The water-soluble polymer suspensions of this invention are useful in virtually all applications where dry water-soluble polymers are presently used, the only limitation being that the ammonium salts may not be desirable in some applications. The applications in which the dispersions of this invention may be used include, e.g., water clarification, mineral processing, food and pharmaceutical thickening, cosmetics thickening, agricultural products thickening, oil field applications, building products (e.g., joint cements), ceramics, latex paints, paper coatings, emulsion polymerization, suspension polymerization, etc. Advantages of using the high concentration water-soluble polymer suspensions of this invention include the ability to control thickening action of the polymer (thickening time is reduced substantially), ease of handling and dosage control, avoidance of polymer dusting, etc.

The suspensions may be added to aqueous systems (e.g., aqueous solutions, by simply adding, e.g., pouring, the suspension into the aqueous system. Agitation enhances dissolution. The suspension may also be sprinkled, sprayed, on etc., where desired for a specific end use.

This invention is demonstrated in the following examples, which are illustrative and not intended to be limiting, wherein all parts, percentages, etc., are by weight. Distilled water was used in each instance.

EXAMPLE 1

In an open reaction vessel, 22.5 parts of technical grade diammonium phosphate (obtained from Monsanto Company, St. Louis, Mo.) was dissolved into 52.5 parts of distilled water with stirring. With continued stirring, 25 parts of Natrosol ® 250GR hydroxyethylcellulose (Aqualon Company, Wilmington, Del.) was dispersed in the solution. After addition was completed, the vessel was sealed and 29" Hg of vacuum was applied for 15 minutes, with stirring, to remove entrained air. The resultant suspension was poured into a glass storage container and stored at room temperature for three days, after which time no appreciable settling of the solid hydroxyethylcellulose particles was noted, and the suspension remained fluid and pourable.

EXAMPLE 2

In an open reaction vessel, 30 parts of fertilizer grade diammonium sulfate (Agway, Inc., Syracuse, N.Y.) was dissolved into 45 parts of distilled water with stirring. With continued stirring, 25 parts of Aqualon TM carboxymethyl hydroxyethyl cellulose 420H (Aqualon Company, Wilmington, Del.) was dispersed in the solution. After addition was completed, mixing was continued for 15 minutes, and the resultant suspension was poured into a glass storage container and stored at room temperature. One day later no appreciable settling of the solid carboxymethylhydroxyethylcellulose particles was noted, and the suspension remained fluid and pourable.

EXAMPLE 3

In an open reaction vessel, 75 parts of "10–34" ammonium polyphosphate aqueous fertilizer fluid (Agway, Inc., Syracuse, N.Y.) (1.44 gram/cc specific gravity with a dried salt content of 59 weight %) was added to a reaction vessel with stirring. With continued stirring, 25 parts of Aqualon TM carboxymethylcellulose 7H3SXF, (Aqualon Company, Wilmington, Del.) was dispersed in the solution. After addition was completed, the vessel was sealed and 29" Hg of vacuum was applied for 15 minutes, with stirring, to remove entrained air. The resultant suspension was poured into a glass storage container and stored at room temperature for three days, after which time no appreciable settling of the solid carboxymethylcellulose particles was noted, and the suspension remained fluid and pourable.

EXAMPLES 4

In an open reaction vessel, 51.8 parts of diammonium sulfate (Agway, Inc., Syracuse, N.Y.) was dissolved into 96.2 parts of distilled water with stirring. With continued stirring, 1 part of Sylox 15 hydrophilic fumed silica (Davison Chemical Company, Baltimore, Md.) was added to the vessel. Then, Aqualon TM carboxymethyl-hydroxyethyl-cellulose 420H (Aqualon Company, Wilmington, Del.) was dispersed in the solution. After addition was completed, mixing was continued for 5 minutes and, then, 2 parts of Min-U-Gel FG attapulgite clay (Floridin Company, Quincy, Fla.) was added and stirring was continued for 15 minutes. The resultant suspension had a Brookfield Viscosity (#2 spindle, 30 rpm) of 208 centipoise. It was poured into a glass storage container and stored at room temperature for 30 days, after which no appreciable settling of the solid carboxymethylhydroxyethylcellulose particles was noted, and the suspension remained fluid and pourable.

After 11 days of storage, 8 parts of the suspension was added to 192 parts of water with stirring. The carboxymethyl hydroxyethyl cellulose dispersed without lumps, then rapidly thickened the water to form a smooth solution.

COMPARATIVE EXAMPLE 5

In order to demonstrate the advantages of this invention, 2 parts of Aqualon TM carboxymethylhydroxyethylcellulose 420H (Aqualon Company, Wilmington, Del.) was added to 198 parts of water under identical mixing conditions to those used in adding the suspension to water in Example 4. The carboxymethylhydroxyethylcellulose, in this case, formed lumps which were extremely difficult to dissolve.

COMPARATIVE EXAMPLE 6

In order to compare the claimed invention with the invention of U.S. Pat. No. 4,283,229, an experiment similar to example V 1 of that patent was conducted using Aqualon TM carboxymethylhydroxyethylcellulose 420H. A salt solution was prepared by dissolving 21 parts of $K_2CO_3$ in 54 parts of water with stirring and, then, 25 parts of carboxymethylhydroxyethylcellulose was dispersed in the solution with stirring. The solids separated from the liquid after 1 day.

COMPARATIVE EXAMPLE 7

In order to compare the claimed invention with the invention of U.S. Pat. No. 4,283,229, an experiment similar to example V 4 of that patent was conducted using Aqualon TM carboxymethylhydroxyethylcellulose 420H. A salt solution was prepared by dissolving 19.2 parts of $MgSO_4$ in 60.8 parts of water with stirring and, then, 20 parts carboxymethylhydroxyethylcellulose was dispersed in the solution with stirring. The solids separated from the liquid after 1 day.

COMPARATIVE EXAMPLE 8

In order to compare the claimed invention with the invention of U.S. Pat. No. 4,069,062, an experiment similar to example 1 of that patent was conducted using Aqualon TM carboxymethylhydroxyethylcellulose 420H. A salt solution was prepared by dissolving 22.3 parts of aluminum sulfate in 66.7 parts of water with stirring and, then, 10 part of carboxymethylhydroxyethylcellulose together with 1 part of bentonite clay were added to the solution with stirring. A gel formed.

COMPARATIVE EXAMPLE 9

In order to compare the claimed invention with the invention of U.S. Pat. No. 4,069,062, an experiment similar to example 2 of that patent was conducted using Aqualon TM carboxymethylhydroxyethylcellulose 420H. A salt solution was prepared by dissolving 11.9 parts of sodium sulfate in 67.1 parts water with stirring and, then, 16 parts carboxymethylhydroxyethylcellulose together with 1 part of bentonite clay were added to the solution with stirring. A paste formed.

EXAMPLE 10

In an open reaction vessel containing 149 parts of "10–34" concentrated aqueous ammonium polyphosphate fertilizer solution, measuring 1.44 specific gravity and having a dried salt content of 59% by weight (Agway, Inc., Syracuse, N.Y.) was added 1 part of Min-U-Gel FG attapulgite clay (Floridin Company, Quincy, Fla.). Then, Aqualon TM carboxymethylcellulose 7HXF (Aqualon Company, Wilmington, Del.) was added to the solution and stirring was continued for 15 minutes. The resulting suspension was poured into a glass storage container and stored at room temperature for one week, after which no appreciable settling of the solid carboxymethylcellulose particles was noted, and the suspension remained fluid and pourable.

After 6 days of storage, 4 parts of the suspension was added to 196 parts of water with stirring. The carboxymethylhydroxyethylcellulose dispersed without lumps, then rapidly thickened the water to form a solution having a Brookfield Viscosity (#3 spindle, 30 rpm) of greater than 2000 centipoise.

EXAMPLE 11

The procedures of Example 10 were repeated using Aqualon TM carboxymethylcellulose 7H3SXF (Aqualon Company, Wilmington, Del.). Similar results to those of Example 10 were obtained.

COMPARATIVE EXAMPLE 12

In order to compare the claimed invention with the invention of U.S. Pat. No. 4,069,062, a process similar to that of example 1, from column 2, lines 15–19, of that patent was run using Aqualon TM carboxymethylcellulose 7H3SXF. Thus, a salt solution was prepared by dissolving 22.3 parts of aluminum sulfate in 66.7 parts water with stirring and, then, 10 parts carboxymethylcellulose together with 1 part of bentonite clay were added to the solution with stirring. Gross separation of the solids from the liquid phase occurred within one day.

The separated phases were mixed so as to prepare a homogenized mixture and, then, 4 parts of the suspension was added to 196 parts of water with stirring. The mixture did not impart a viscosity increase to the water, indicating that the carboxymethylcellulose had been rendered ineffective as a thickening agent.

COMPARATIVE EXAMPLE 13

In order to compare the claimed invention with the invention of U.S. Pat. No. 4,069,062, a comparison similar to example 2 of that patent was run using Aqualon TM carboxymethylcellulose 7H3SXF. A salt solution was prepared by dissolving 11.9 parts of sodium sulfate in 67.1 parts water with stirring and, then, 20 parts carboxymethylhydroxyethylcellulose, together with 1 part of bentonite clay, were added to the solution with stirring. A paste formed.

COMPARATIVE EXAMPLE 14

In order to compare the claimed invention with the invention of U.S. Pat. No. 4,283,229, an experiment similar to example V 1 of that patent was conducted using Aqualon TM carboxymethylcellulose 7H3SXF. A salt solution was prepared by dissolving 21 parts of $K_2CO_3$ in 54 parts water with stirring and, then, it was attempted to add 20 parts carboxymethylcellulose to the solution while stirring. A solid gel resulted during addition of carboxymethylcellulose.

COMPARATIVE EXAMPLE 15

In order to compare the claimed invention with the invention of U.S. Pat. No. 4,283,229, an experiment similar to example V 4 of that patent was conducted using Aqualon TM carboxymethylcellulose 7H3SXF. A salt solution was prepared by dissolving 19.2 parts of $MgSO_4$ in 60.8 parts water with stirring. Then, during the subsequent addition of 10.8 parts carboxymethylcellulose with stirring a solid gel resulted.

EXAMPLE 16

In an open reaction vessel, 34 parts of technical grade diammonium phosphate (obtained from Monsanto Company, St. Louis, Mo.) was dissolved into 103.5 parts of distilled water with stirring. With continued stirring, 1 part of Sylox 15 hydrophilic fumed silica (Davison Chemical Company, Baltimore, Md.) and 1 part of Min-U-Gel FG (attapulgite clay) (Floridin Company, Quincy, Fla.) were added to the solution. Then, with continued stirring, 60 parts of Natrosol ® Plus Grade D-330 hydrophobically modified carboxymethylcellulose (Aqualon Company, Wilmington, Del.) was dispersed in the solution. The resultant suspension was poured into a glass storage container and stored at room temperature for over 60 days, after which time no appreciable separation of the solid hydrophobically modified hydroxyethylcellulose particles was noted, and the suspension remained fluid and pourable.

EXAMPLE 17

In an open reaction vessel, 238.2 parts of technical grade diammonium phosphate (Monsanto Company, St. Louis, Mo.) was dissolved into 643.8 parts of distilled water with stirring. With continued stirring, 6 parts Sylox 15 hydrophilic fumed silica (Davison Chemical Company, Baltimore, Md.) and 12 parts Min-U-Gel FG attapulgite clay (Floridin Company, Quincy, Fla.) were added to the solution. Then, 60 parts of Natrosol TM 250 hydroxyethyl cellulose (Aqualon Company, Wilmington, Del.) was dispersed in the solution and stirring was continued for 15 minutes. The resultant suspension had a Brookfield viscosity (#3 spindle, 30 rpm) of 2500 cps. It was poured into a glass storage container and stored at room temperature for over 60 days, after which time no appreciable separation of the solid hydrophobically modified hydroxyethylcellulose particles was noted, and the suspension remained fluid and pourable.

EXAMPLE 18

In an open reaction vessel, 40 parts of fertilizer grade diammonium sulfate (Agway, Inc., Syracuse, N.Y.) was added to 60 parts of distilled water and dissolved with stirring. With continued stirring, 1 part Sylox 15 hydrophilic fumed silica (Davison Chemical Company, Baltimore, Md.) and 1 part Min-U-Gel FG attapulgite clay (Floridin Company, Quincy, Fla.) were added to the solution. Then, with continued stirring, 50 parts of Natrosol TM GXR hydroxyethylcellulose (Aqualon Company, Wilmington, Del.) was dispersed in the solution to produce a 33 weight % suspension of hydroxyethylcellulose. Afterwards, the vessel was sealed and vacuum was applied for 10 minutes, with continued stirring, to remove entrained air. The resultant suspension was poured into a glass vessel and measured to have a Brookfield viscosity (#3 spindle, 30 rpm) of 1100 cps.

EXAMPLE 19

In an open reaction vessel, 63.6 parts of fertilizer grade diammonium sulfate (Agway, Inc., Syracuse, N.Y.) was added to 95.4 parts of distilled water and dissolved with stirring. Then, with continued stirring, 40 parts Reten ® 523 high molecular weight anionic polyacrylamide (Hercules Incorporated, Wilmington, Del.) was dispersed in the solution. After 15 minutes of stirring, the resultant suspension was poured into a glass vessel and measured to have a Brookfield viscosity (#1 spindle, 60 rpm) of 70 cps. The resultant suspension was poured into a glass storage container and stored at room temperature for seven days, after which time the suspension was fluid and pourable.

COMPARATIVE EXAMPLE 20

This comparative example was carried out using a salt described in U.S. Pat. No. 4,069,062.

A saturated sodium chloride solution was prepared by adding 50 parts sodium chloride to 80 parts distilled water, stirring the solution for 60 minutes, allowing the undissolved sodium chloride to settle and decanting the supernatant liquid. Then, 25 parts of Aqualon TM carboxymethylcellulose 7H3SXF (Aqualon Company, Wilmington, Del.) was added to 75 parts of the sodium chloride solution while stirring. A gelled product formed during the course of carboxymethylcellulose addition.

COMPARATIVE EXAMPLE 21

This comparataive example was carried out using a salt described in U.S. Pat. No. 4,069,062.

A saturated sodium phosphate monobasic (Mallinkrodt, Inc., St. Louis, Mo.) solution was prepared by adding 50 parts sodium to 80 parts distilled water, stirring the solution for 60 minutes, allowing the undissolved sodium phosphate monobasic to settle and decanting the supernatant liquid. Then, 25 parts of Aqualon TM carboxymethylcellulose 7H3SXF (Aqualon Company, Wilmington, Del.) was added to 75 parts of the sodium phosphate monobasic solution while stirring. A gelled product formed during the course of carboxymethylcellulose addition.

COMPARATIVE EXAMPLE 22

This comparative example was carried out using a salt described in U.S. Pat. No. 4,069,062.

A saturated magnesium sulfate solution was prepared by adding 50 parts of magnesium sulfate to 80 parts distilled water, stirring the solution for 60 minutes, allowing the undissolved magnesium sulfate to settle and decanting the supernatant liquid. Then, 25 parts of Aqualon TM carboxymethylcellulose 7H3SXF (Aqualon Company, Wilmington, Del.) was added to 75 parts of magnesium sulfate solution while stirring. A gelled product formed during the course of carboxymethylcellulose addition.

EXAMPLE 23

In an open reaction vessel, 36.8 parts of diammonium phosphate (Monsanto Company, St. Louis, Mo.) was added to 110.2 parts of distilled water and dissolved with stirring. With continued stirring, 1 part Sylox 15 hydrophilic fumed silica (Davison Chemical Company, Baltimore, Md.) and 2 parts Min-U-Gel FG attapulgite clay (Floridin Company, Quincy, Fla.) were added to the solution. Then, with continued stirring, 50 parts of Natrosol ® 250 GR hydroxyethylcellulose (Aqualon Company, Wilmington, Del.) was dispersed in the solution. A stable fluid, pourable suspension of hydroxyethylcellulose resulted.

COMPARATIVE EXAMPLE 24

This comparative example was carried out using a salt described in U.S. Pat. No. 4,069,062.

The procedures of Example 23 were repeated using sodium phosphate, monobasic (Mallinkrodt, Inc. St. Louis, Mo.). A gelled product was obtained after 10 minutes for stirring the hydroxyethylcellulose containing solution.

COMPARATIVE EXAMPLE 25

This comparative example was carried out using salt described in U.S. Pat. No. 4,283,229.

In an open reaction vessel, 7.4 parts of potassium carbonate and 1 part powdered alumina "A-15" (ALCOA, Pittsburgh, Pa.) were dissolved in 66.6 parts distilled water. Upon addition of 25 parts of Natrosol ® 250 GR hydroxyethylcellulose (Aqualon Company, Wilmington, Del.) a thick paste resulted.

CONTROL EXAMPLE 26

This Control Example shows preparation of a semigloss paint using dry powder Natrosol ® Plus hydrophobically modified hydroxyethylcellulose.

A pigment grind was prepared by milling 80 parts propylene glycol, 8.5 parts Tamol Sg-1 (Rohm & Haas Co., Philadelphia, Pa.) dispersant, 2 parts Hercules ® SGL defoamer (Hercules Incorporated, Wilmington, Del.), 240 parts titanium dioxide R-900 (E. I. duPont de Nemours & Co., Inc., Wilmington, Del.) and 25 parts amorphous silica 1160 (Illinois Minerals Company, Cairo, Ill.) in a high speed Cowles blade for 20 minutes. Then, to the pigment grind were sequentially added 65 parts water, 500 parts Rhoplex AC-417 latex (Rohm and Haas Co., Philadelphia, Pa.), 2.7 parts Hercules ® SGL defoamer, 10 parts propylene glycol, 21.6 parts Texanol TM (Eastman Kodak Co., Eastern Chemical Products, Kingsport, Tenn.), 1 part Super Ad-it (Tenneco, Elizabeth, N.J.) and 0.5 parts Triton GR-7M (Rohm & Haas Co., Philadelphia, Pa.) to form a base paint.

Then, a polymer slurry was formed by dispersing 15 parts of Natrosol ® Plus hydrophobically modified hydroxyethylcellulose Grade 330 into 85 parts of pH 6.5 water. Then, before the onset of thickening (less than 3 minutes after addition of the polymer to water), 6.4 parts of this slurry was added along with 25.5 parts of water to 400 parts of the base paint to form a thickened paint.

EXAMPLE 27

This Example shows preparation of a semigloss paint using the Natrosol ® Plus hydrophobically modified hydroxyethylcellulose suspension of Example 16.

A semigloss paint was formed by adding 3.2 parts of the Natrosol ® Plus hydrophobically modified hydroxyethylcellulose solution prepared in Example 16 along with 28.7 parts of water to 400 parts of the base paint prepared as described in Example 24.

The paints prepared in Examples 26 and 27 had the characteristics listed in Table 1, below.

TABLE 1

| Thickener | Semigloss Latex Paint Thickener | |
|---|---|---|
| | Control Example 26 (dry powder control) | Example 27 (dispersion) |
| Polymer dosage: (active HEC added to paint) | 0.22% | 0.22% |
| Paint Viscosity, KU: (overnight) | 95 | 89 |
| ICI Viscosity, cps: | 2.0 | 2.2 |
| Leveling: | 3 | 4 |
| Sag Resistance: | 24 | 19 |
| Scrub Resistance: | 1600 cycles+ | 1600 cycles+ |
| Gloss 60°/80° | 26.7/54.8 | 27.9/56.5 |

The data in Table 1 indicate that the paints prepared in Control Example 26 and Example 27 had equivalent rheological and film properties. Thus, it can be seen that the fluid suspension of this invention can be employed to thicken latex paints without adverse effects resulting from the salt.

CONTROL EXAMPLE 28

This Control Example shows use of dry carboxymethyl cellulose in the pelletization of iron ore.

Taconite ore concentrate from a U.S. operation comprising greater than 60% iron and less than 5% silica, consisting of fine particles passing 100% through 200 U.S. mesh were pelletized as follows.

In a Hobart oscillating mixer, 3268 parts of ore having a moisture content of 8.2% was mixed with water to reach a moisture content of 9.5%.

A measured quantity of dry Aqualon TM carboxymethylcellulose 7HX (Aqualon Company, Wilmington, Del.) was sprinkled on the ore and mixing was carried out over 3 minutes, after which the mixture was passed through a high speed shredder to form a uniform blend suitable for balling.

Balls were made in a 15 inch diameter (size 6.00-6) airplane tire, rotated at a rate of 65 revolution per minute with the axis of rotation being horizontal, as follows:

1. Small amounts of concentrated ore were fed by hand into the rotating tire alternately with distilled water mist. As seed balls formed they were removed and hand screened to −4.75,+4 mm. 800 g of concentrate was set aside for seed preparation. This process was continued until at least 100 g of seed balls were generated.

2. 92 g of prepared seeds were put in the rotating tire and moistened slightly with fine mist spray of distilled water. Part of the remaining 2440 g of concentrate was added to the seeds as quickly as possible over a 1 minute period. The balls were removed and the newly formed seeds (−4.75 mm) were screened out and discarded.

3. The +4.75 mm balls were returned to the rotating tire and the remainder of the concentrate was added over a 1-1½ minute time period. The finished balls were then rolled for 5 seconds.

4. The wet balls were screened to determine size distribution. A −12.7,+11.2 mm cut was used for moisture content determination and physical tests.

Two standard tests were used to measure performance, the drop test and the compression test. The drop test and compressive strength test demonstrate the ability of wet and dry balls to withstand cracking under normal handling conditions. Balls must have sufficient prefired strength so that they do not crack during handling or transfer in the pellet plant, but must not be so plastic that they disform and impair bed permeability in the indurating furnace.

The drop test was carried out by dropping the wet balls repeatedly from a height of 18 inches onto a smooth steel plate. The number of drops required to crack each ball was recorded and the average value for 10 balls reported.

Compressive strength was measured by applying pressure to both wet and dry pellets until the pellets crumbled. The apparatus consisted of a Chatillon spring testing device with appropriate range dial push-pull gauge (5 lb capacity for wet, 25 lb for dry). Dried balls were obtained by placing green balls in a 105° C. oven for 18 hours. Finished ball moisture was determined simultaneously. Compressive strength results presented are also the average of 10 balls tested.

Generally mine operators require that green balls be able to withstand at least 6 drops. Similarly, dry compressive strength of 10 or more pounds is desired. In practice, however, it has been difficult to attain dry strengths of greater than 5 lbs with non-bentonite binders at economically acceptable use levels.

Example 29

This Example shows use of the carboxymethylcellulose suspension of Example 10 in the pelletization of iron ore.

The procedures of Control Example 29 were repeated using the carboxymethylcellulose suspension of Example 10 in place of the dry carboxymethyl cellulose.

Results of Control Example 28 and Example 29 are shown in the following Table.

TABLE 2

| | Iron Ore Binder | |
|---|---|---|
| Example | Binder Dosage Lbs/Ton Ore | Taconite Dry Avg. Compressive Strength |
| 28 | 1.0 | 6.0 lbs |
| 29 | 4.0 (1.0 lb/ton CMC) | 9.3 lbs |

The pellets produced using the fluid carboxymethylcellulose suspension had a higher compressive strength, on an equal carboxymethylcellulose weight basis, when compared to the pellets produced using dry carboxymethylcellulose. The results indicate that the salts present in the carboxymethylcellulose suspension were beneficial to performance of the water soluble polymer in this application.

CONTROL EXAMPLE 30

This Control Example shows use of dry powder hydroxyethylcellulose as a thickener for a paper coating.

Sequentially, 600 parts water, 14 parts Dispex N-40 (Allied Colloid, Suffolk, Va.), and 1400 parts Hydrasperse kaolin clay (J. M. Huber, Macon, Ga.) were added to a mixing vessel and were mixed at high speed for 30 minutes to form a base clay slip. Next, 429 parts of the base clay slip was mixed with 72 parts of Dow 620 styrene-butadiene latex (Dow Chemical Company, Midland, Mich.) and 6 parts of Floco 501 lubricant (Henkel Process Chemical, Inc., Morristown, N.J.) were added. Then, 38 parts of 4% Natrosol ® 250 GR hydroxyethylcellulose solution, prepared by slowly adding the hydroxyethylcellulose to water, along with an additional 40 parts water were added to the base clay slip.

EXAMPLE 31

This Example shows use of the hydroxyethylcellulose suspension of Example 17 as a thickener for a paper coating.

Sequentially, 600 parts water, 14 parts Dispex N-40 (Allied Colloid, Suffolk, Va.), and 1400 parts Hydrasperse kaolin clay (J. M. Huber, Macon, Ga.) were added to a mixing vessel and were mixed at high speed for 30 minutes to form a base clay slip. Next, 429 parts of the base clay slip was mixed with 72 parts of Dow 620 styrene-butadiene latex (Dow Chemical Company, Midland, Mich.) and 6 parts of Floco 501 lubricant (Henkel Process Chemical, Inc., Morristown, NJ) were added. Then, 6 parts of the the Natrosol ® 250 GR hydroxyethylcellulose suspension of Example 17, along with an additional 56 parts water, were added to the base clay slip.

The paper coatings were tested for Brookfield viscosity, water retention and high shear viscosity. The results are shown in Table 3 below.

TABLE 3
Paper Coating Thickener

| Example | Dosage | Brookfield Viscosity | Water Retention | Hercules Viscosity* |
|---|---|---|---|---|
| 30 | 0.5 parts | 1200 cps | 7.0 sec | 35.4 cps |
| 31 | 0.5 parts (active) | 1160 cps | 7.0 sec | 42.3 cps |

*Shear rate of $4.59 \times (10)_4 \, sec^{-1}$.

The data in Table 3 indicates that the paper coating prepared with the hydroxyethylcellulose suspension performed equivalently to that prepared with the dry powder hydroxyethyl cellulose.

EXAMPLE 32

This example demonstrates use of carboxymethylcellulose as a stabilizer for a hydroxyethylcellulose suspension per this invention.

Into a beaker containing 120 parts of distilled water, 1.00 parts of Aqualon ™ carboxymethylcellulose 7L1T was added and the mixture was stirred for about 30 minutes until the carboxymethylcellulose dissolved. Then, 28.2 parts of diammonium phosphate (Monsanto Company, St. Louis, Mo.) was added to the mixture and stirred to dissolve. The carboxymethylcellulose remained stable in this media as evidenced by the fact that no precipitate or haziness were observed. In a final step, 50.8 parts of Natrosol ® 250 GR hydroxyethylcellulose was added to the mixture and the mixture was stirred for 15 minutes to disperse the hydroxyethylcellulose. The product was a fluid, pourable suspension that showed minimal solids/liquid separation after storage in a closed container at 50° C. for 24 hours.

While the invention has been described with respect to specific embodiments, it should be understood that they are not intended to be limiting and that many variations and modifications are possible without departing from the scope of this invention.

I claim:

1. An aqueous suspension consisting essentially of greater than 20%, by total weight of the suspension, of at least one anionic or nonionic water-soluble polymer dispersed in an aqueous solution of an ammonium salt having a multivalent anion, wherein the weight ratio of the multivalent ammonium salt to the water in the suspension is at least 0.15.

2. The aqueous suspension of claim 1, wherein the water-soluble polymer is an anionic water-soluble polymer.

3. The aqueous suspension of claim 1, wherein the water-soluble polymer is nonionic water-soluble polymer.

4. The aqueous suspension of claim 1, wherein the nonionic or anionic water-soluble polymer is selected from the group consisting of natural gums and their derivatives, starch and its derivatives, partially and fully hydrolyzed polyvinyl alcohols, polyacrylamide polymers and copolymers, polyvinylpyrrolidone and derivatives thereof, and polyamides.

5. The aqueous suspension of claim 1, wherein the water-soluble polymer is selected from the group consisting of carboxymethylcellulose, anionic polyacrylamide, hydroxyethylcellulose, hydroxypropylcellulose, carboxymethylhydroxyethylcellulose, hydrophobically modified hydroxyethylcellulose, hydroxyethylhydroxypropylcellulose, polyvinyl alcohol, polyethylene oxide, xanthan gum, polyacrylamide, polyvinylpyrrolidone, methylhydroxypropylcellulose, methylhydroxyethylcellulose, guar, hydroxypropyl guar and 3-alkoxy-2-hydroxypropylcellulose.

6. The aqueous suspension of claim 1, wherein the water-soluble polymer is selected from the group consisting of sodium carboxymethylcellulose, anionic polyacrylamide, hydroxyethylcellulose, hydroxypropylcellulose, carboxymethylhydroxyethylcellulose 3-butoxy-2-hydroxypropylhydroxyethylcellulose and hydrophobically modified hydroxyethylcellulose.

7. The aqueous suspension of claim 1, wherein the aqueous suspension contains greater than 20% to 50%, based upon the total weight of the aqueous suspension, of the at least one anionic or nonionic water-soluble polymer.

8. The aqueous suspension of claim 4, wherein the aqueous suspension contains greater than 20% to 50%, based upon the total weight of the aqueous suspension, of the at least one anionic or nonionic water-soluble polymer.

9. The aqueous suspension of claim 1, wherein the aqueous suspension contains 22% to 35%, based upon the total weight of the aqueous suspension, of the at least one anionic or nonionic water-soluble polymer.

10. The aqueous suspension of claim 4, wherein the ammonium salt having a multivalent anion is selected from the group consisting of diammonium phosphate, diammonium sulfate and ammonium polyphosphate.

11. The aqueous suspension of claim 10, wherein the weight ratio of the ammonium salt having a multivalent anion to the water in the suspension formula is 0.18 to 0.6.

12. The aqueous suspension of claim 1, further containing up to 2%, by weight of the total suspension, of a stabilizer.

13. The aqueous suspension of claim 1, further containing up to 2%, by weight of the total suspension, of a stabilizer selected from the group consisting of fumed silica, clay, carboxymethylcellulose and xanthan gum.

14. The aqueous suspension of claim 13, wherein the polymer is hydroxyethylcellulose and the stabilizer is sodium carboxymethylcellulose.

15. The aqueous suspension of claim 1, having had entrained air removed by vacuum.

16. The aqueous suspension of claim 1, which is stable for at least three hours after preparation.

17. The aqueous suspension of claim 1, which is stable for at least one day after preparation.

18. The aqueous suspension of claim 1, which is stable for at least one month after preparation.

19. A process of preparing an aqueous suspension, consisting essentially of dissolving an ammonium salt having a multivalent anion in water and, then, dispersing therein greater than 20%, by total weight of the resultant suspension, of at least one anionic or nonionic water-soluble polymer, wherein in the resultant suspension the weight ratio of the ammonium salt to the water in the suspension is at least 0.15.

20. A process of preparing an aqueous solution of dissolved water-soluble polymer, comprising adding the aqueous suspension of claim 1 into an aqueous system in a manner such that the water-soluble polymer dissolves.

21. The aqueous suspension of claim 1, wherein the aqueous viscosity of the water-soluble polymer is on the order of 5,000 or more centipoise in a 5 weight % aqueous polymer solution.

22. The aqueous suspension of claim 4, wherein the aqueous viscosity of the water-soluble polymer is on the order of 5,000 or more centipoise in a 5 weight % aqueous polymer solution.

23. A process of preparing an aqueous suspension as claimed in claim 19, wherein the nonionic or anionic water-soluble polymer is selected from the group consisting of natural gums and their derivatives, starch and its derivatives, partially and fully hydrolyzed polyvinyl alcohols, polyacrylamide polymers and copolymers, polyvinylpyrrolidone and derivatives thereof, and polyamides.

24. A process as claimed in claim 19, wherein the aqueous viscosity of the water-soluble polymer is on the order of 5,000 or more centipoise in a 5 weight % aqueous polymer solution.

25. A process of preparing an aqueous solution of dissolved water-soluble polymer as claimed in claim 20 wherein the nonionic or anionic water-soluble polymer is selected from the group consisting of natural gums and their derivatives, starch and its derivatives, partially and fully hydrolyzed polyvinyl alcohols, polyacrylamide polymers and copolymers, polyvinylpyrrolidone and derivatives thereof, and polyamides.

26. A process as claimed in claim 20, wherein the aqueous viscosity of the water-soluble polymer is on the order of 5,000 or more centipoise in a 5 weight % aqueous polymer solution.

* * * * *

UNITED STATES PATENT AND TRADEMARK OFFICE
CERTIFICATE OF CORRECTION

PATENT NO. :  4,883,536                                    Page 1 of 2

DATED :       November 28, 1989

INVENTOR(S) : BURDICK

It is certified that error appears in the above-identified patent and that said Letters Patent is hereby corrected as shown below:

Column 1, Line 30, "  to  "

should read  --  or  --

Column 7, Lines 22 and 23,

"  carboxymethylhydroxyethylcellulose  "

should read  --  carboxymethylcellulose  --

Column 8, Lines 27 and 28,  "  carboxymethylcellulose  "

should read  --  hydroxyethylcellulose  --

UNITED STATES PATENT AND TRADEMARK OFFICE
CERTIFICATE OF CORRECTION

PATENT NO. : 4,883,536
DATED : November 28, 1989
INVENTOR(S) : BURDICK

It is certified that error appears in the above-identified patent and that said Letters Patent is hereby corrected as shown below:

Column 9, Line 37, " comparataive "

should read -- comparative --

Column 10, Line 17, " for "

should read -- of --

Column 11, Line 41, " revolution "

should read -- revolutions --

Signed and Sealed this

Eighteenth Day of June, 1991

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,883,536

DATED : November 28, 1989

INVENTOR(S) : BURDICK

It is certified that error appears in the above-identified patent and that said Letters Patent is hereby corrected as shown below:

Column 2, Lines 30-32:

Delete the following sentence: --"It is stated that stable solutions of the cellulose derivatives are only formed when alumina is added to the system." --

Signed and Sealed this

Thirteenth Day of October, 1992

Attest:

DOUGLAS B. COMER

*Attesting Officer*     *Acting Commissioner of Patents and Trademarks*